United States Patent
Huang (10) Patent No.: US 10,216,304 B2
(45) Date of Patent: Feb. 26, 2019

(54) TOUCH SCREEN DISPLAY DEVICE WITH IMPROVED ESD PROTECTION

(71) Applicant: DELL PRODUCTS L.P., Round Rock, TX (US)

(72) Inventor: Hong-Ji Huang, Hsin-Chu (TW)

(73) Assignee: Dell Products LP, Round Rock, TX (US)

( * ) Notice: Subject to any disclaimer, the term of this patent is extended or adjusted under 35 U.S.C. 154(b) by 0 days.

(21) Appl. No.: 15/589,468

(22) Filed: May 8, 2017

(65) Prior Publication Data

US 2018/0321779 A1    Nov. 8, 2018

(51) Int. Cl.
*G06F 3/041* (2006.01)
*G06F 3/044* (2006.01)
*G02F 1/1333* (2006.01)

(52) U.S. Cl.
CPC ............ *G06F 3/0412* (2013.01); *G06F 3/044* (2013.01); *G06F 3/0416* (2013.01); *G02F 1/13338* (2013.01); *G02F 2201/503* (2013.01); *G06F 2203/04107* (2013.01); *G06F 2203/04111* (2013.01)

(58) Field of Classification Search
USPC .................................................. 345/170–178
See application file for complete search history.

(56) References Cited

U.S. PATENT DOCUMENTS

| | | | |
|---|---|---|---|
| 8,310,460 B2 | 11/2012 | Saitou | |
| 9,086,772 B2 | 7/2015 | Lee | |
| 9,459,666 B2 | 10/2016 | Ho | |
| 2010/0290166 A1 | 11/2010 | Lin et al. | |
| 2015/0317011 A1 | 11/2015 | Chen et al. | |
| 2016/0098143 A1 | 4/2016 | Kida et al. | |
| 2016/0149401 A1 | 5/2016 | Chen et al. | |
| 2016/0179255 A1* | 6/2016 | Yang | G06F 3/047 345/173 |
| 2017/0090652 A1 | 3/2017 | Sato et al. | |
| 2018/0004322 A1* | 1/2018 | Nakanishi | G02F 1/133385 |

(Continued)

OTHER PUBLICATIONS

Walker, "Part1: Fundamentals of Projected-Capacitive Touch Technology", SID Display Weed, Jun. 2014, 315 pgs.

(Continued)

*Primary Examiner* — Tony O Davis
(74) *Attorney, Agent, or Firm* — Egan Peterman Enders Huston (57) ABSTRACT

Embodiments of a touch screen display device having improved electrostatic discharge (ESD) protection are provided herein with a touch screen and a display module underlying the touch screen. The touch screen described herein includes a touch panel substrate having a plurality of transmit lines, a plurality of receive lines, a plurality of routing traces and a ground ring formed thereon. The ground ring includes inner edges, which conform to and surround a periphery of the transmit lines, receive lines and routing traces, and outer edges that are substantially parallel and adjacent to edges of the touch panel substrate. At least one of the outer edges of the ground ring extend past at least one outer edge of the display module along at least one entire side of the display module, thereby providing ESD protection to the display module on all such sides.

20 Claims, 7 Drawing Sheets

(56) References Cited

U.S. PATENT DOCUMENTS

2018/0039348 A1* 2/2018 Schwager ............... G06F 3/041
2018/0093042 A1* 4/2018 Klemm .................. A61M 5/24

OTHER PUBLICATIONS

Chen et al., "Touch Screen and Method of Compensating for Differences in Routing Trace Path Lengths", DELL:216, U.S. Appl. No. 15/498,035, filed Apr. 26, 2017, 43 pgs.

Wacom, Touch & AES Sensor Design Guideline, Rev. 2.0, Jun. 2, 2015, 29 pgs.

Chen et al, "Touch Screen and Method of Compensating for Differences in Routing Trace Path Lengths", U.S. Appl. No. 15/498,035, Apr. 26, 2017, 36 pgs.

\* cited by examiner

TOUCH SCREEN DISPLAY DEVICE WITH IMPROVED ESD PROTECTION

FIELD

This application relates to display devices, and more particularly to electrostatic discharge (ESD) protection for touch screen display devices.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems typically utilize a display device to provide visual output related to operations occurring within and/or being performed by the information handling system. Depending on the type of information handling system, the display device can be physically connected or affixed to the system, or may be communicatively connected to the system via one or more cables and/or intermediary components (e.g., a docking station). Some display devices include a touch sensitive input device that enables a user to provide input to the information handling system through direct interaction with the display device.

A display device including a touch sensitive input device is otherwise referred to as a touch screen display device. As known in the art, a touch sensitive input device includes a touch screen, which enables a user to provide input to, or interact with, the display device or the information handling system via touch events, which are detected by components of the touch sensitive input device at precise locations on the touch screen. There are many different types of touch screen technology that use different methods of sensing touch events. Examples of touch screen technology include resistive touch screens, capacitive touch screens, surface acoustic wave (SAW) touch screens, infrared touch screens and optical touch screens.

A current design trend in touch screen display devices is to reduce the border dimensions of such devices, and extend the active area of the touch screen further out toward one or more edges of the display device. In some touch screen display devices, structural components that were previously used to protect electronic components of the display device from electrostatic discharge (ESD) have been removed to achieve increasingly smaller border widths. Without adequate ESD protection, the electronic components of the display device may be damaged by ESD events.

SUMMARY

The following description of various embodiments of touch screen display devices, information handling systems and methods is not to be construed in any way as limiting the subject matter of the appended claims.

Generally speaking, the present disclosure provides touch screen display devices with improved electrostatic discharge (ESD) protection. More specifically, the present disclosure provides a touch panel substrate having a unique ground ring configuration, which protects components of the touch screen display device from ESD events.

According to one embodiment, the touch screen display device described herein may include a touch screen and a display module underlying the touch screen. The display module may be generally configured to generate images, video content and/or graphical user interfaces for display on the touch screen. The touch screen may be generally configured for detecting touch events on the touch screen. In general, the touch screen may include a touch panel substrate having a plurality of transmit lines, a plurality of receive lines, a plurality of routing traces and a ground ring formed thereon. Unlike conventional touch panel substrates, the ground ring may include inner edges, which conform to and surround a periphery of the transmit lines, receive lines and routing traces, and outer edges that are substantially parallel and adjacent to edges of the touch panel substrate.

In some embodiments, at least one outer edge of the ground ring may extend past at least one outer edge of the display module along at least one entire side of the display module to protect the display module from ESD on the at least one entire side. In some embodiments, outer edges of the ground ring may extend past outer edges of the display module along an entire first side and along an entire second side of the display module. In some embodiments, outer edges of the ground ring may extend past outer edges of the display module along an entire first side, along an entire second side and along an entire third side of the display module, thereby protecting the display module from ESD on all such sides.

The ground ring described herein generally comprises a width, which is defined between the inner edges and the outer edges of the ground ring. In some embodiments, a ground ring of inconsistent width may be formed on the touch panel substrate for protecting the display module from ESD. However, the particular geometry of the ground ring may differ, in one or more embodiments, depending on the particular routing trace configuration used for routing signals to/from the transmit and receive lines on the touch panel substrate.

In one embodiment, a ground ring of inconsistent width may be substantially wider in a top portion of the touch panel substrate and substantially narrower in a bottom portion of the touch panel substrate. In another embodiment, a ground ring of inconsistent width may be substantially wider in a bottom portion of the touch panel substrate and substantially narrower in a top portion of the touch panel substrate. In a further embodiment, a ground ring of inconsistent width may be substantially wider along a first side of the touch panel substrate and substantially narrower along a second side of the touch panel substrate opposing the first side. In some embodiments, a ground ring of inconsistent width may be symmetrically formed on opposing sides of the touch panel substrate. In other embodiments, a ground ring of inconsistent width may not be symmetrically formed on opposing sides of the touch panel substrate.

According to another embodiment, an information handling system including a touch screen display device having a touch screen and a display module underlying the touch screen is provided herein. The touch screen may include a touch panel substrate having a ground ring, as generally described above.

According to another embodiment, a method for protecting display device components from electrostatic discharge (ESD) is provided herein. In some cases, the method may include providing a touch screen display device having a touch screen and a display module underlying the touch screen. The touch screen may include a touch panel substrate having a ground ring, as generally described above. The method may further include discharging current of an ESD event to ground through the ground ring.

BRIEF DESCRIPTION OF THE DRAWINGS

Other advantages of the invention will become apparent upon reading the following detailed description and upon reference to the accompanying drawings in which.

While the present disclosure is susceptible to various modifications and alternative forms, specific embodiments thereof are shown by way of example in the drawings and will herein be described in detail. It should be understood, however, that the drawings and detailed description thereto are not intended to limit the disclosure to the particular form disclosed, but on the contrary, the present disclosure is to cover all modifications, equivalents and alternatives falling within the spirit and scope of the present disclosure as defined by the appended claims.

DESCRIPTION OF ILLUSTRATIVE EMBODIMENTS

As noted above, this disclosure generally relates to touch screen display devices with improved electrostatic discharge (ESD) protection. In some embodiments, the touch screen display devices described herein may be part of, or configured for use with, a variety of different information handling systems.

Figure 1:
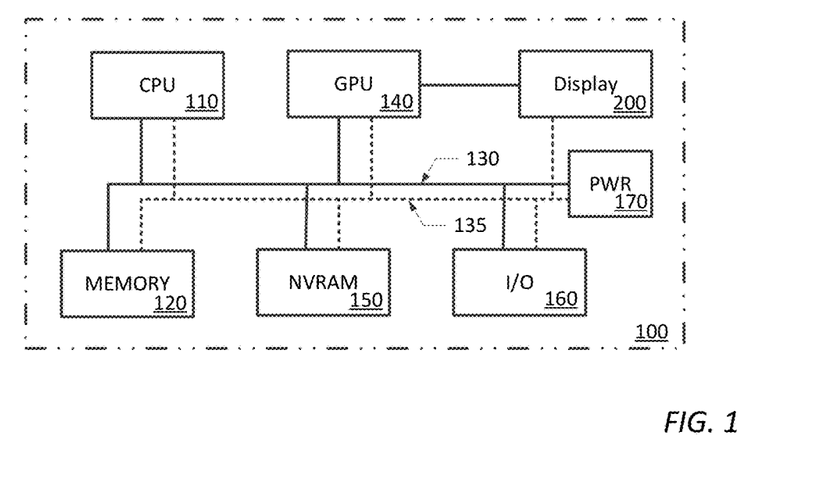
FIG. 1 is a block diagram illustrating exemplary components of an information handling system comprising, or configured for use with, a touch screen display device.

For purposes of this disclosure, an information handling system, such as information handling system 100 shown in FIG. 1, may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touch screen and/or a video display. The information handling system may also include one or more buses operable to transmit communications between the various hardware components.

With reference now to FIG. 1, there is depicted a block diagram representing a generalized embodiment of an information handling system 100 comprising and/or communicatively coupled to a display device 200. As depicted in FIG. 1, information handling system 100 may generally include one or more information handling resources. The information handling resources may include any component, system, device or apparatus of information handling system 100, including without limitation processors, busses, computer-readable media, input-output devices and/or interfaces, storage resources, network interfaces, motherboards, electro-mechanical devices (e.g., fans), and/or power supplies.

In the generalized embodiment shown in FIG. 1, information handling system 100 includes at least one central processing unit (CPU) 110, which is coupled to system memory 120 via system interconnect 130 (otherwise referred to as a system bus). Also coupled to CPU 110, via system interconnect 130, is a graphics card with a graphics processing unit (GPU) 140 located thereon, nonvolatile storage (NVRAM) 150, and one or more input/output devices 160. Input/output devices 160 may include, but are certainly not limited to, keyboards, mice, touch pads, speakers, and cameras.

Information handling system 100 requires a power source to operate the various electronic components disposed therein. The power source can be provided via an external power source (e.g., mains power) and an internal power supply regulator, and/or by an internal power source, such as a battery. As shown in FIG. 1, power management system 170 may be included within information handling system 100 for moderating the available power from the power source. The power management system 170 may be coupled to one or more components of the information handling system 100 via a power bus 135 to provide the required power, as well as to perform other power-related administrative tasks of the information handling system.

System memory 120 and/or NVRAM 150 may be generally configured to store software and/or firmware modules and one or more sets of data that can be utilized during operation of information handling system 100. In some embodiments, one or more of these software and/or firmware modules can be loaded into system memory 120 from NVRAM 150 during operation of system 100. In one embodiment, system memory 120 may include, or may be loaded with, a plurality of such modules, including one or more firmware (FW) modules, a basic input/output system (BIOS), an operating system (OS), and one or more user application(s). These software and/or firmware modules have varying functionality when their corresponding program code is executed by a main processing device (e.g., CPU 110) or a secondary processing device (e.g., GPU 140) of information handling system 100.

As noted above, information handling system 100 also includes a display device 200, which may be a part of, or communicatively coupled to, the information handling system 100. For example, display device 200 may be permanently or detachably affixed to the information handling system 100, when system 100 is a laptop computer, tablet computer, e-reader, "2 in 1" system or a mobile device (e.g., PDA or smart phone). Alternatively, display device 200 may be a stand-alone display device, which is communicatively coupled to information handling system 100 via one or more cables and/or other interfaces (e.g., a docking station), when system 100 is a desktop computer. Regardless of whether the display device is a stand-alone device, or integrated with the information handling system 100, display device 200 may be coupled to receive and/or transmit data signals from/to a processing device (e.g., CPU 110 or GPU 140) of system 110, and may be further coupled to receive power from the power management system 170 within system 100.

Generally speaking, display device 200 may be any type dynamic display capable of displaying images, video content and/or graphical user interfaces on a display screen of the display device, and may include any type of light emitting diode (LED), organic LED (OLED), liquid crystal display (LCD), electroluminescence (EL) or other display technology. Of the various types of display devices that can be provided with different information handling systems, perhaps the most common type of display device in use today is a liquid crystal display (LCD) device.

Regardless of the type of display technology used (e.g., LCD, LED, OLED, EL, etc.), display device 200 preferably includes a touch sensitive input device that enables a user to provide input to the information handling system 100 through direct interaction with the display device. As noted above, a display device comprising a touch sensitive input device (i.e., a touch screen display device) enables a user to provide input to, or interact with, display device 200 or information handling system 100 via touch events, which are detected by components of the touch sensitive input device at precise locations on the touch screen.

Figure 2:
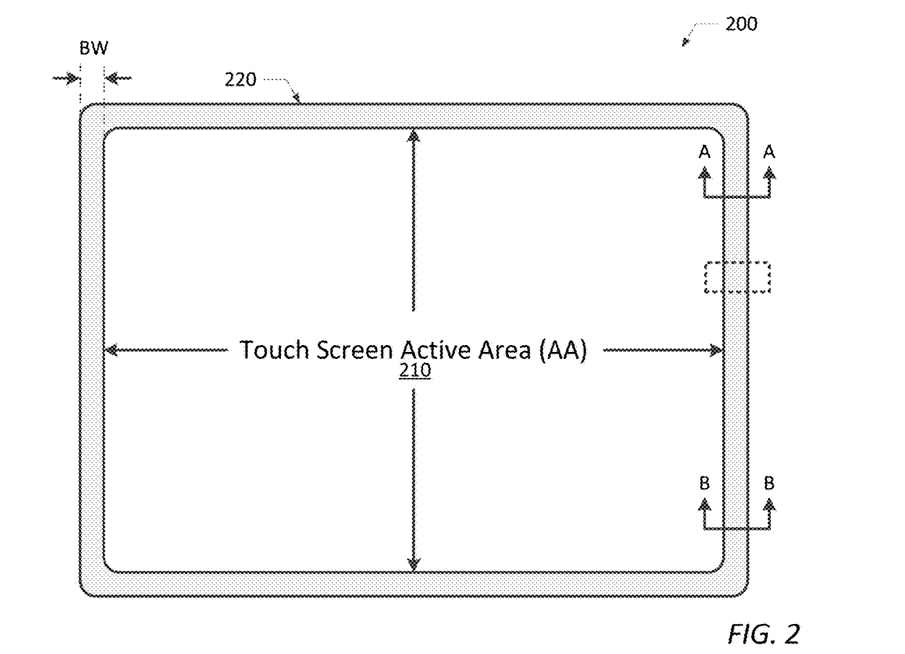
FIG. 2 is a graphical representation of a touch screen display device having a relatively large touch screen active area and a relatively small border width.

FIG. 2 is a graphical representation of a touch screen display device 200 comprising a touch screen active area (AA) 210 for display images, video content and/or user interface components, and a bezel 220 surrounding the touch screen active area 210. In general, bezel 220 may provide structural support to the display device components and/or may attach to a support structure housing the display device components. In some display devices, bezel 220 may be implemented with an electrically non-conductive, lightweight material, such as a plastic material, to reduce weight and cost.

As noted above, a current design trend in touch screen display devices is to reduce the border dimensions of such devices, and extend the active area of the display screen further out toward one or more edges of the display device. As shown FIG. 2, bezel 220 is depicted as having a relatively small border width (BW). Although not restricted to such an example, the border width of bezel 220 on one or more sides of the device may be about 3 mm or less. Reducing the border dimensions of a touch screen display device, such as touch screen display device 200, allows the touch screen active area (AA) 210 to be extended further out toward edges of the display device, thereby resulting in a comparatively larger display screen without increasing the overall dimensions (e.g., height and width) of the display device.

In order to achieve increasingly smaller border widths, it has become necessary in some touch screen display devices to remove certain component(s) that were previously used to protect electronic components of the display device from electrostatic discharge (ESD). In display devices with relatively larger border widths (e.g., about 5 mm or more), a metal bracket or other conductive shielding component may be provided within the (plastic) bezel 220 to protect edges of the electronic components from ESD. This metal bracket is omitted from the touch screen display device 200 shown in FIG. 2 to achieve the smaller border width provided by bezel 220 and reduce the overall thickness of the display device 200. Without the metal bracket (or another conductive shielding component), electronic components of the display device may be susceptible to and damaged by ESD events.

Figure 3:
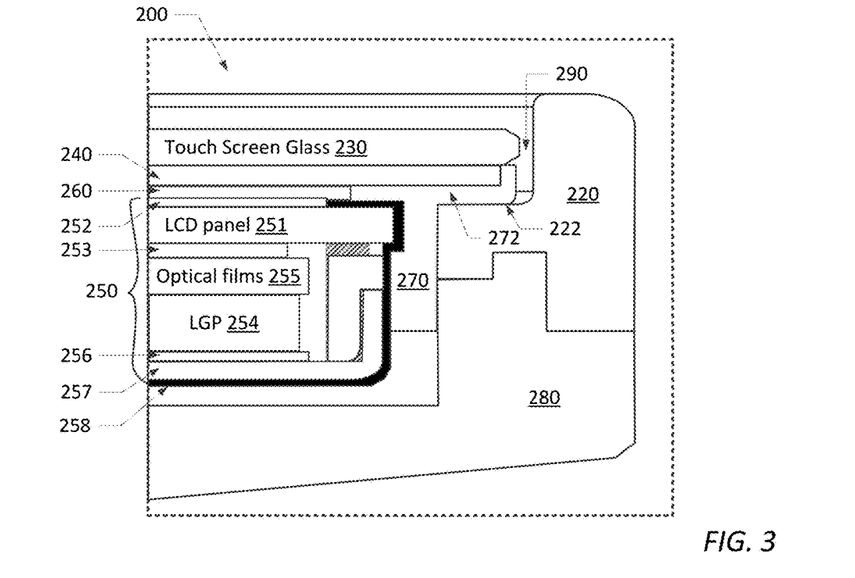
FIG. 3 is a cross-section through a right-side border of the touch screen display device shown in FIG. 2 illustrating exemplary components of the touch screen display device.

FIG. 3 is a cross-section through a right-side border of the touch screen display device 200 shown in FIG. 2 illustrating exemplary components of the touch screen display device. In the exemplary embodiment shown in FIG. 3, touch screen display device 200 includes a touch screen and a display module 250 underlying the touch screen. The touch screen includes a touch panel 240 coupled or bonded to the touch screen glass 230 (otherwise referred to as the display screen). In some cases, a lower surface of touch panel 240 may be further coupled or bonded to the display module 250 via an adhesive layer 260.

Touch panel 240 is generally configured for detecting touch events on the touch screen glass 230. As described in more detail below, touch panel 240 may include a plurality of transmit lines (or drive lines) and a plurality of receive lines (or sense lines), which intersect with the transmit lines to form a plurality of sense nodes. In order to detect the presence of a finger or other object on or near one or more of the sense nodes, a drive signal is supplied to one or more of the transmit lines via routing traces, which may be provided on the left and right sides of the touch panel substrate. When a user touches a particular location on the touch screen glass 230, a touch signal is induced across one or more of the sense nodes on the touch panel 240 and forwarded to receive circuitry of the touch sensitive input device via additional routing traces.

Display module 250 is generally configured for generating images, video content and/or graphical user interfaces for display on touch/display screen 230. Although not strictly limited to such, display module 250 may be a liquid crystal module (LCM), in one embodiment. As shown in FIG. 3, LCM 250 includes a liquid crystal display (LCD) panel 251 having a layer of liquid crystals sandwiched between an upper and lower glass substrate, and a color filter formed upon the upper glass substrate of the LCD panel to provide a pattern of red, green and blue (RGB) pixels. LCM 250 may also include a vertically polarizing film 252 formed upon the upper glass substrate of LCD panel 251 to polarize light entering the display device, and a horizontally polarizing film 253 formed upon the lower glass substrate of LCD panel 251 to block/pass light. Since LCD panel 251 produces no light of its own, a backlight panel may be provided within LCM 250 to illuminate the RGB pixels within LCD panel 251 and create an image on the touch/display screen 230 of the touch screen display device 200. In some embodiments (not shown), the backlight panel may include an array of light sources (e.g., an array of cold cathode fluorescent lamps, CCFLs, LEDs or OLEDs) and a diffuser panel, which are positioned behind LCD panel 251 for providing evenly diffused illumination thereto.

In other embodiments (see, FIG. 3), the backlight panel may include one or more serial strings of light sources (e.g., LEDs or OLEDs) positioned along one or more edges of the display device for emitting light into a light guide plate (LGP) 254. In FIG. 3, edge-mounted light sources (not shown) and LGP 254 are arranged behind LCD panel 251. The light emitted from the edge-mounted light sources propagates through LGP 254 to evenly distribute the light across the LGP, and is transmitted from an upper surface of the LGP for illuminating LCD panel 251. In some embodiments, one or more optical films 255 (including, e.g., a diffuser panel and prism sheet) may be arranged above LGP 254 to further distribute the light transmitted from the upper surface of the LGP. In some embodiments, reflector 256 may be disposed behind LGP 254 to help redirect light towards the LCD panel 251 and out of the display device.

As shown in FIG. 3, LCM 250 may include metal bracket 257 for supporting the display generating components of LCM 250. In the illustrated embodiment, metal bracket 257 is positioned under the display generating components of LCM 250, and extends upward along side edges of the LCM. Shield tape 258 is provided along the bottom surface and side edges of LCM 250 to encapsulate all but the upper surface of the LCM. Shield tape 258 provides a structural enhancement to the LCM 250 by preventing separation of LCD panel 251 from the backlight panel. Shield tape 258 also acts as a light shield to prevent light leakage from the backlight component. In some cases, shield tape 258 may be an electrically conductive tape (e.g., an aluminum foil tape), which may further function to protect LCM 250 from ESD events.

As shown in FIG. 2, bezel 220 extends around an entire periphery of the touch screen display device 200. As shown in FIG. 3, bezel 220 may extend slightly above an upper surface of display screen 230 (e.g., about 0.15 mm to about 0.3 mm, depending on mechanical design), but does not extend over any portion of the display screen. This bezel design reduces the border width of the display device and enables the active area of the display screen to be extended. In some embodiments, bezel 220 may be attached to a support structure or chassis 280 housing the display device components, as shown in FIG. 3. In other embodiments (not shown), bezel 220 and chassis 280 may be integrally formed as one piece. As shown in FIG. 3, side edges of display screen glass 230 and touch panel 240 sit upon and are supported by an electrically non-conductive (e.g., plastic) bumper 270. In addition to supporting the touch screen glass 230 and touch panel 240, bumper 270 extends downward along side edges of LCM 250 to prevent lateral movement of the LCM. An outer portion 272 of bumper 270 rests upon an interior ledge 222 of bezel 220, in the embodiment shown in FIG. 3.

The configuration shown in FIG. 3 maximizes the active area 210 of the touch screen and enables the border width (BW) of the bezel 220 to be reduced (e.g., to about 3 mm). However, shield tape 258 provided along the bottom surface and side edges of LCM 250 may not adequately protect the LCM from electrostatic discharge (ESD). In particular, ESD may couple into LCM 250 via the small air gap 290 formed between side edges of the touch screen 230/240 and bezel 220, and the plastic bumper 270 used to support touch screen 230/240 and LCM 250. Without adequate protection, ESD could damage circuitry coupled to LCM 250 and/or the routing traces provided on touch panel 240.

Figure 4:
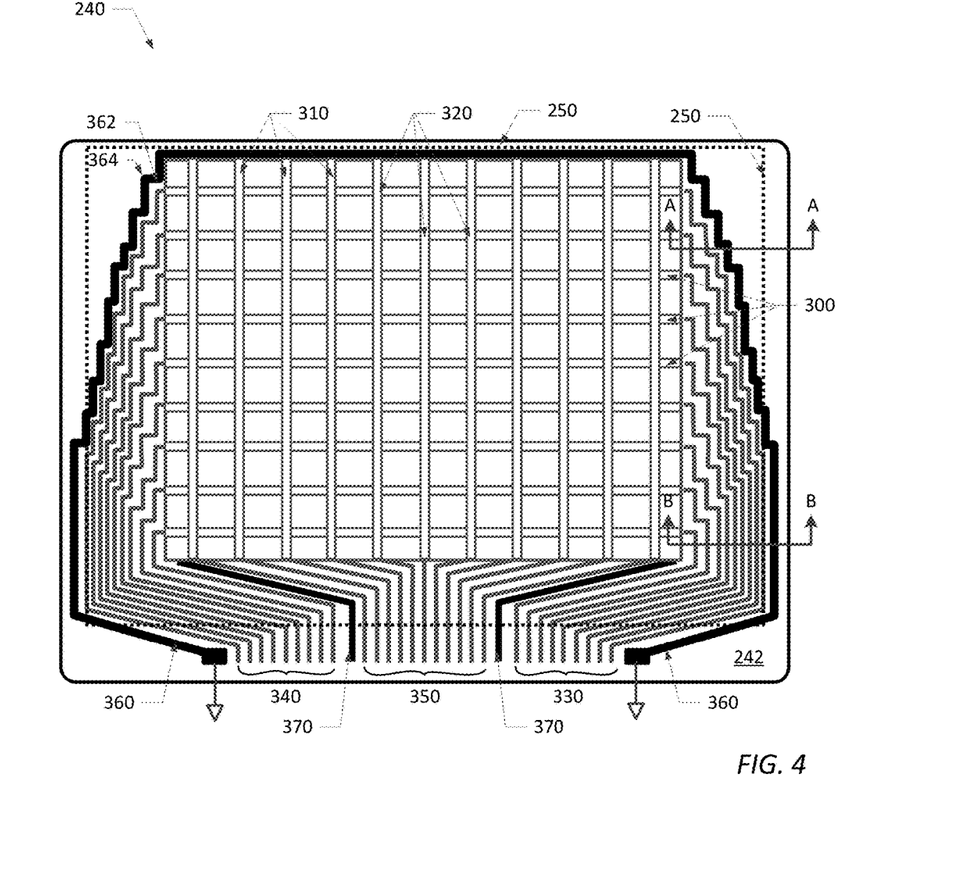
FIG. 4 is a graphical representation of a touch panel that may be included within the touch screen display device of FIG. 2, wherein a ground ring of substantially consistent width is provided on the touch panel substrate.
Figure 5:
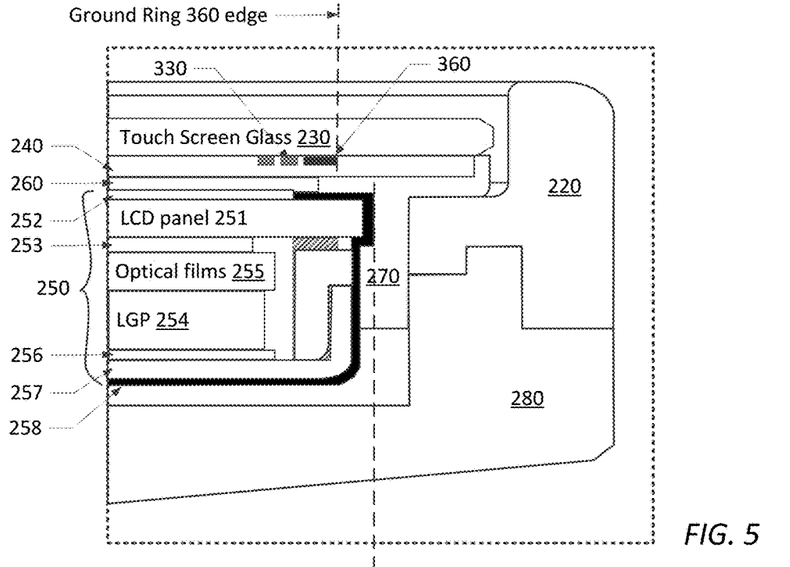
FIG. 5 is a cross-section through a right-side border of the touch screen display device shown in FIG. 2 along line A-A (i.e., within a top portion of the display device) when the touch panel shown in FIG. 4 is included within the touch screen display device.
Figure 6:
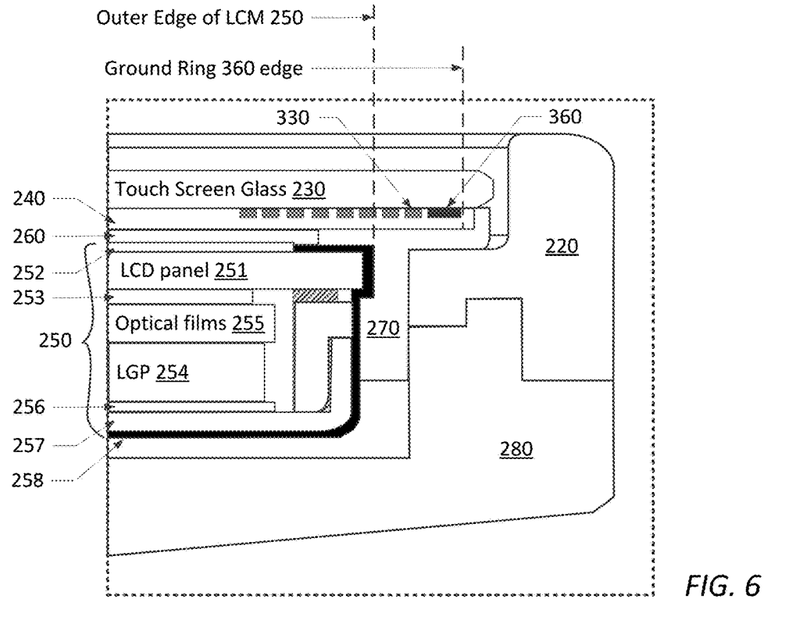
FIG. 6 is a cross-section through a right-side border of the touch screen display device shown in FIG. 2 along line B-B (i.e., within a bottom portion of the display device) when the touch panel shown in FIG. 4 is included within the touch screen display device.

FIGS. 4-6 illustrate an embodiment of a touch screen display device 200, which may not provide adequate ESD protection for touch panel 240 and LCM 250 in all locations of the display device. In particular, FIG. 4 provides a graphical representation of a touch panel 240 that may be included within touch screen display device 200. Dotted lines are used in FIG. 4 to depict an outer edge of the LCM 250 underlying touch panel 240. FIGS. 5 and 6 provide cross-sectional views through the right-side border of the touch screen display device 200 shown in FIG. 2, similar to the cross-sectional view shown in FIG. 3 and discussed above. In FIGS. 5 and 6, however, cross-sections are obtained along line A-A (i.e., within a top portion of the display device) and along line B-B (i.e., within a bottom portion of the display device) of the display device 200 and touch panel 240 to illustrate the lack of ESD protection within the top portion of the display device.

As shown in FIG. 4, touch panel 240 includes a plurality of transmit lines 300 and a plurality of receive lines 310, which are arranged at an angle (e.g., 90°) to transmit lines 300, such that a sense node 320 is formed at the "intersection" of each transmit line 300 and receive line 310. Although transmit lines 300 and receive lines 310 are depicted as straight lines in FIG. 4, it is understood that transmit lines 300 and/or receive lines 310 may be alternatively implemented with any suitable geometry. It is further understood that although transmit lines 300 and receive lines 310 are depicted as arranged substantially perpendicular to each other, they may be arranged at angles other than 90°, as long as they "intersect" (i.e., cross over each other in vertically spaced planes) to form sense nodes 320.

In order to detect the presence of a finger (or other object) near one or more of the sense nodes 320, a drive signal is supplied to one or more of transmit lines 300 via the routing traces 330/340 provided, for example, on the left and right sides of the touch panel 240 substrate. The supplied drive signals cause a signal charge to be injected into the receive lines 310 and a capacitance to be generated at each sense node 320. When a user touches a particular location on the touch screen, a touch event may be detected at one or more of the sense nodes 320 by detecting a change in the signal charge caused by a change in the capacitance induced across the affected sense nodes 320. The signal charges injected into the receive lines 310 may be forwarded to receive circuitry coupled to touch panel 240 via routing traces 350 provided, for example, on a bottom side of the touch panel substrate.

In the embodiment of FIG. 4, a ground ring 360 of substantially consistent width is provided on three sides of the touch panel substrate 242 to provide noise immunity and ESD protection. Additional ground lines 370 are provided on a fourth side of the touch panel substrate 242 for noise immunity. As shown in FIG. 4, ground ring 360 surrounds a periphery of the touch panel transmit and receive lines 300/310 and the routing traces 330/340 coupled to the transmit lines. Unlike ground rings, which are included on many conventional touch panel substrates, ground ring 360 follows, tracks or conforms to a periphery of the transmit lines 300, receive lines 310 and routing traces 330/340. Because the ground ring 360 shown in FIG. 4 is provided with a substantially consistent width, the inner edges 362 and the outer edges 364 of the ground ring are configured to follow, track or conform to a periphery of the transmit lines 300, receive lines 310 and routing traces 330/340.

Due to the particular routing trace configuration shown in FIG. 4, a trace width of the routing traces 330/340 on the left and right sides of the touch panel substrate is wider near the bottom and narrower near the top of the touch panel substrate 242. Since a ground ring 360 of substantially consistent width is formed adjacent to the outer routing traces on the left and right sides of the touch panel substrate 242 shown in FIG. 4, the ground ring is positioned closer to the left and right sides of the touch panel substrate 242 in the bottom portion. However, the ground ring 360 is positioned farther from the left and right sides of the touch panel substrate 242 in the top portion of the touch panel substrate 242, which leaves a relatively large amount of touch panel substrate surface area outside of the protection of the ground ring 360.

FIG. 5 provides a cross-sectional view through a right-side border of the touch screen display device 200 shown in FIG. 2 along line A-A (i.e., within a top portion of the display device), while FIG. 6 provides a cross-sectional view through the right-side border of touch screen display device 200 along line B-B (i.e., within a bottom portion of the display device). As shown in the comparison of FIGS. 5 and 6, ground ring 360 extends past an outer edge of LCM 250 in the bottom portion of the display device (FIG. 6), but not in the top portion of the display device (FIG. 5). This lack of ESD protection in the top portion of the display device leaves LCM 250 vulnerable to electrostatic discharge, which may couple into the LCM via air gap 290 and plastic bumper 270. In some cases, ESD may damage circuitry coupled to the LCM and/or routing traces 330/340 provided on the touch panel substrate 242, as mentioned above.

Figure 7:
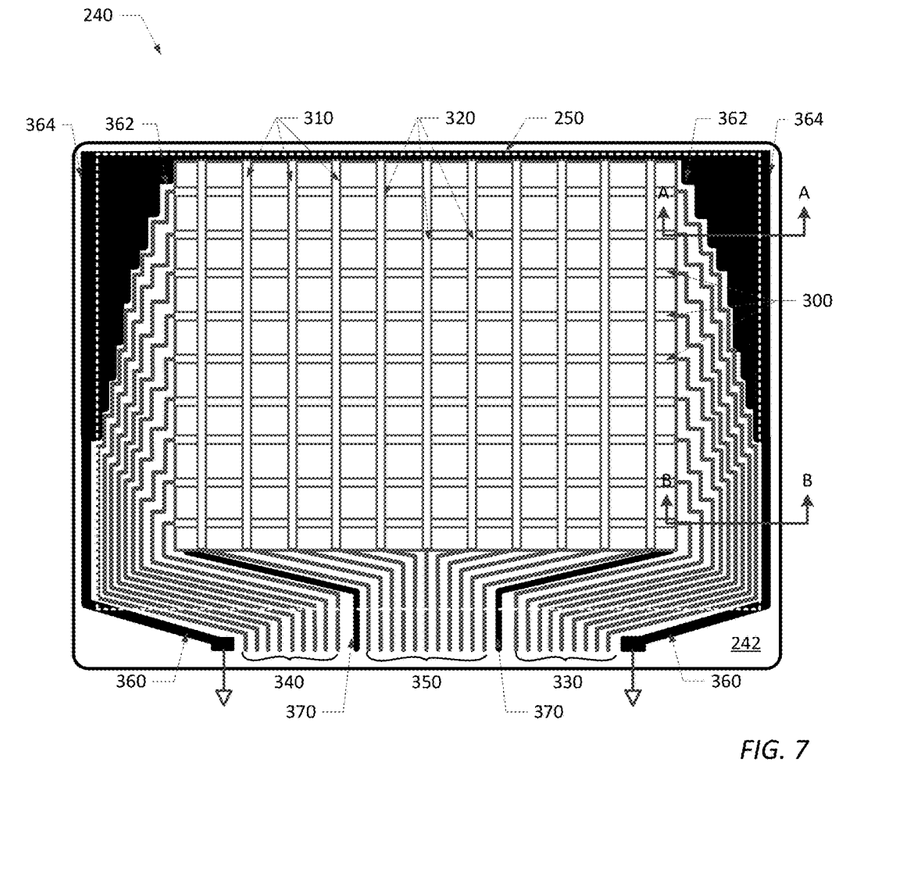
FIG. 7 is a graphical representation of one preferred embodiment of a touch panel that may be included within the touch screen display device of FIG. 2, wherein a ground ring of inconsistent width is provided on the touch panel substrate.

FIGS. 7-10 illustrate various embodiments of a touch screen display device 200 including an improved touch panel 240, according to the present disclosure. More specifically, FIG. 7 provides a graphical representation of an improved touch panel 240 that may be used within a touch screen display device 200 to provide ESD protection in all locations of the display device. Like the previously described embodiments, touch panel 240 may generally include a plurality of transmit lines 300, a plurality of receive lines 310 and a plurality of sense nodes 320. Routing traces 330/340 may be provided, in one example, on left and right sides of the touch panel substrate 242 for supplying drive signals to the transmit lines 300. Near the bottom of touch panel substrate 242, routing traces 350 may be coupled to receive lines 310 for forwarding sense signals detected from one or more of the sense nodes 320 to receive circuitry associated with the touch panel 240. As before, the dotted lines shown in FIG. 7 depict an outer edge of the LCM 250 underlying touch panel 240.

As in the previously described embodiments, touch panel 240 may also include ground rings 360 and 370, which may be coupled to system ground or another suitable ground node for dissipating ESD current. Unlike the ground ring 360 depicted in FIG. 4, however, the ground ring 360 shown in FIG. 7 is uniquely configured to extend past outer edges of LCM 250 along the entire left side, the entire right side and the entire top of touch panel substrate 242, thereby protecting the LCM from ESD on all such sides by discharging current of an ESD event away from LCM 250 and/or routing traces 330/340 to a ground node. This is achieved, in the embodiment of FIG. 7, by providing ground ring 360 with a substantially inconsistent width.

In the particular routing trace configuration shown in FIG. 7, ground ring 360 is provided with an inconsistent width by making the ground ring substantially wider within the top portion, and substantially narrower within the bottom portion of the touch panel substrate 242. In doing so, ground ring 360 is uniquely configured with inner edges 362, which follow and surround a periphery of the touch panel transmit and receive lines 300/310 and the routing traces 330/340 coupled thereto, and outer edges 364 that are substantially parallel and adjacent to the left side, right side and top edges of the touch panel substrate 242. In comparison to FIG. 4, the ground ring 360 shown in FIG. 7 covers substantially more surface area of the touch panel substrate 242, extending nearly to the left side, right side and top edges of the touch panel substrate 242.

It is noted that a ground ring of "inconsistent width" is not limited to the example ground ring 360 shown in FIG. 7. In fact, the geometry of ground ring 360 is generally dependent on the routing trace configuration or method used for routing signals to/from the transmit and receive lines 300/310 on the touch panel substrate 242. In FIG. 7, a double routing trace method is used for routing signals to transmit lines 300 on both the left and right sides of the touch panel substrate 242. This routing trace configuration results in a ground ring 360, which is symmetrically formed on opposing sides (e.g., left and right sides) of the touch panel substrate 242. In the particular embodiment shown in FIG. 7, the symmetrically formed ground ring 360 is wider at the top and narrower at the bottom on both the left and right sides of the touch panel substrate 242. However, other configurations of ground rings 360 with "inconsistent width" may be used for touch panels having alternative routing trace configurations.

Figure 8:
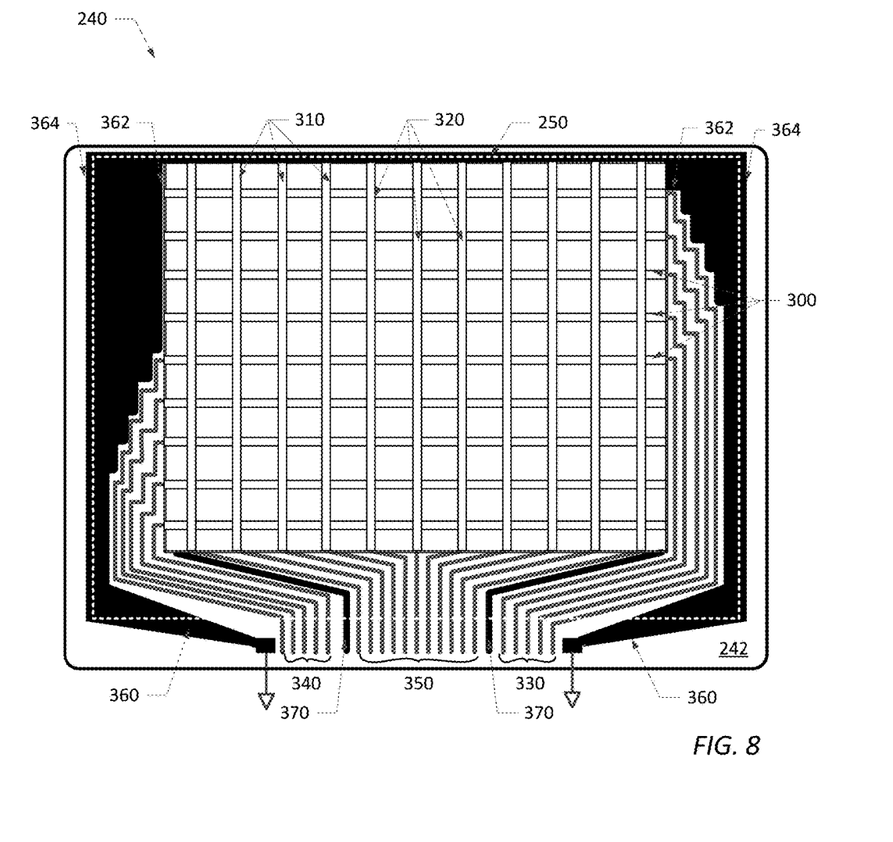
FIG. 8 is a graphical representation of another preferred embodiment of a touch panel that may be included within the touch screen display device of FIG. 2, wherein a ground ring of inconsistent width is provided on the touch panel substrate.

FIG. 8 provides one example of a ground ring 360 with "inconsistent width" that may be provided on a touch panel 240 having a substantially different routing trace configuration. In FIG. 8, approximately half of the transmit lines 300 are coupled to routing traces 340 on the left side, while approximately another half of the transmit lines 300 are coupled to routing traces 330 on the right side of the touch panel substrate 242. In some embodiments, one or more transmit lines 300 near the middle of the touch panel may be coupled to routing traces 330 and 340 on both the left and right sides of the touch panel substrate 242, resulting in the unique routing trace configuration described, for example, in co-pending U.S. patent application Ser. No. 15/498,035 filed Apr. 26, 2017, which is incorporated herein by reference in its entirety for all purposes. Although the routing trace configuration shown in FIG. 8 may also benefit from a ground ring 360, which is substantially wider at the top and narrower at the bottom, the particular routing configuration shown in FIG. 8 results in a ground ring 360, which is not symmetrical on opposing sides (e.g., the left and right sides) of the touch panel substrate 242.

In general, a ground ring 360 of "inconsistent width" may be symmetrical or asymmetrical on opposing sides of the touch panel substrate 242. Although depicted in the illustrated embodiments as being substantially wider at the top and narrower at the bottom, a ground ring 360 of "inconsistent width" is not strictly limited to such a configuration, and may be substantially narrower at the top and wider at the bottom of the touch panel substrate 242, in other embodiments. In yet other embodiments, a ground ring 360 of "inconsistent width" may be wider along a first side (e.g., along the left side or the right side) and narrower along a second side opposing the first side (e.g., along the right side or the left side) when routing traces are coupled to transmit lines 300 primarily (or only) on the second side of the touch panel substrate in a single routing trace configuration.

In all embodiments contemplated herein, a ground ring 360 of "inconsistent width" is one, which is configured with inner edges 362 and outer edges 364. As noted above and shown in the exemplary embodiments of FIGS. 7 and 8, the inner edges 362 of ground ring 360 are configured to follow and surround a periphery of the touch panel transmit and receive lines 300/310 and the routing traces 330/340 coupled thereto. On the other hand, the outer edges 364 of ground ring 360 are configured to be substantially parallel and adjacent to edges of the touch panel substrate 242 (e.g., parallel to the left side, right side and top edges of the touch panel substrate, as shown in FIGS. 7 and 8). By extending the outer edges 364 of the ground ring 360 nearly to the edges of the touch panel substrate 242 (i.e., by arranging outer edges 364 substantially adjacent to edges of the touch panel substrate 242), preferred embodiments of the ground ring 360 cover substantially more surface area of the touch panel substrate 242 than the embodiment shown in FIG. 4. This increases the likelihood that, should an ESD event occur, the electrical charge will couple into ground ring 360, rather than LCM 250.

Figure 9:
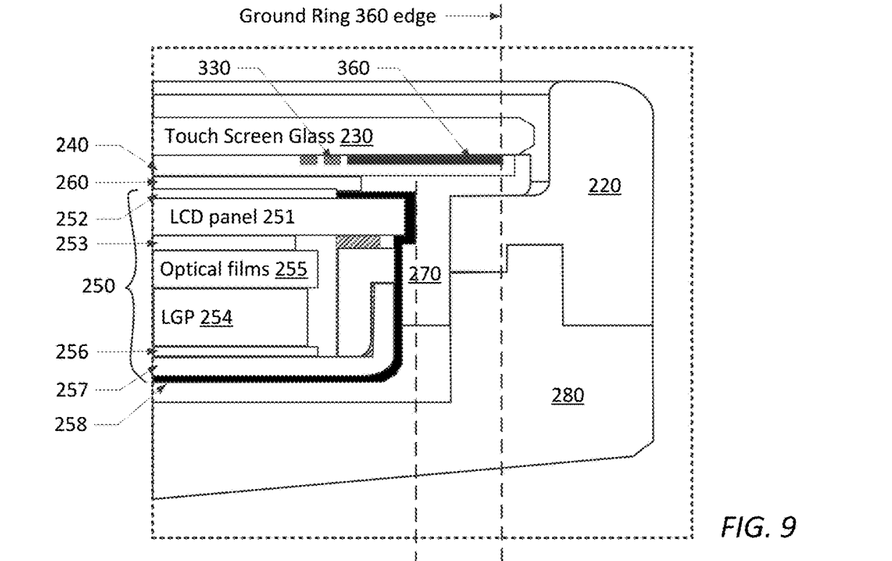
FIG. 9 is a cross-section through a right-side border of the touch screen display device shown in FIG. 2 along line A-A (i.e., within the top portion of the display device) when the touch panel shown in FIG. 7 is included within the touch screen display device.
Figure 10:
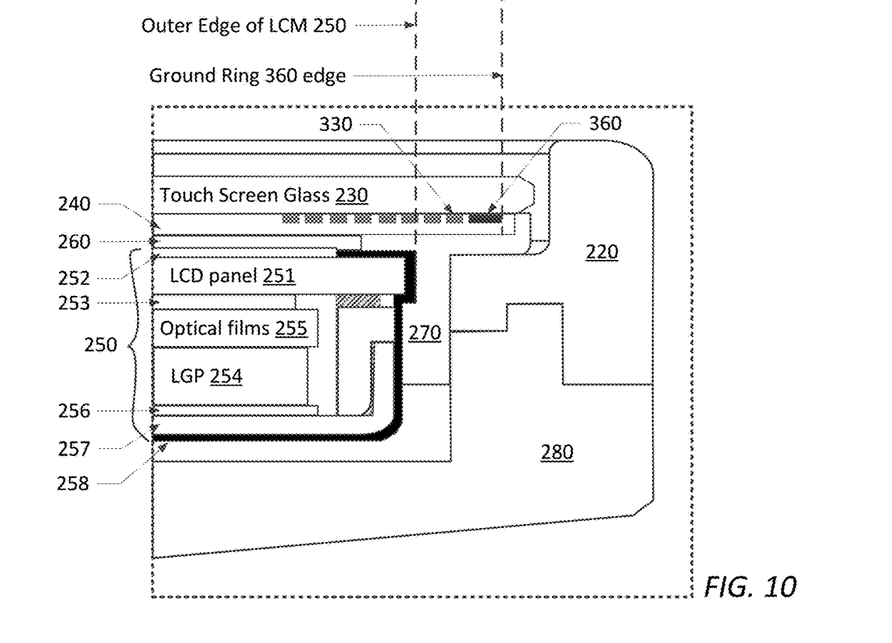
FIG. 10 is a cross-section through a right-side border of the touch screen display device shown in FIG. 2 along line B-B (i.e., within the bottom portion of the display device) when the touch panel shown in FIG. 7 is included within the touch screen display device.

FIGS. 9 and 10 provide cross-sectional views through a right-side border of the touch screen display device 200 shown in FIG. 2 along line A-A (i.e., within a top portion of the display device) and along line B-B (i.e., within a bottom portion of the display device). In contrast to the cross-sectional views shown in FIGS. 5 and 6, FIGS. 9 and 10 illustrate a preferred embodiment of a touch screen display device 200 including a touch panel 240 having a ground ring 360 of inconsistent width formed on the touch panel substrate. While the touch panel 240 embodiment depicted in FIG. 7 is represented in the cross-sectional views of FIGS. 9 and 10, it is noted that other touch panels having alternative routing trace configurations and ground ring 360 configurations may be used without departing from the scope of the present disclosure.

By providing a ground ring 360 of an inconsistent width on the touch panel substrate 242, as shown in FIGS. 7, 9 and 10, ground ring 360 is configured to extend past the outer edge of LCM 250 in the top portion (FIG. 9) and the bottom portion (FIG. 10) of the display device. Although only the right-side border of the touch screen display device 200 is depicted in FIGS. 9 and 10, it can be seen in FIG. 7 that ground ring 360 also extends past the outer edge of the LCM 250 near the left-side and top borders of the touch screen display device 200. In doing so, ground ring 360 protects LCM 250 from electrostatic discharge, which may otherwise couple into the LCM via air gap 290 and plastic bumper 270, as mentioned above.

Preferred embodiments of a touch panel 240 with improved ESD protection is shown in FIGS. 7, 9 and 10 and described in detail above. The improved touch panel design includes a unique ground ring configuration that may be used to improve ESD protection in touch screen display devices, which may be stand-alone display devices or part of an information handling system. Although the improved touch panel design is shown in FIGS. 2 and 9-10 and described above as used within a touch screen display device 200 having a relatively small border width (e.g., about 3 mm), the improved touch panel design is not so limited, and may be used to protect electronic components of substantially any touch screen display device from ESD events.

In addition to a touch screen display device and/or an information handling system, a method is provided herein for protecting electronic components of a touch screen display device from electrostatic discharge (ESD). In some cases, the method may include providing a touch screen display device having a touch screen and a display module underlying the touch screen. Although the touch screen display device is not strictly limited to the touch screen display device 200 shown in FIGS. 2 and 7-10, the touch screen recited in the method preferably includes a touch panel substrate having a unique ground ring configuration, as generally described above. The method may further include discharging current of an ESD event to ground through the ground ring.

While the present disclosure may be adaptable to various modifications and alternative forms, specific embodiments have been shown by way of example and described herein. However, it should be understood that the present disclosure is not intended to be limited to the particular touch panel, display device, and/or information handling system disclosed and illustrated herein, and may include other embodiments and/or combinations of embodiments. Furthermore, certain changes may be made with regard to the touch panel, display device and/or the information handling system disclosed herein without departing from the spirit or scope of the present disclosure. As such, the present disclosure is intended to cover all modifications, equivalents, and alternatives falling within the spirit and scope of the present disclosure as defined by the appended claims.

What is claimed is:

1. A touch screen display device, comprising:
   a touch screen including a touch panel substrate having a plurality of transmit lines, a plurality of receive lines, a plurality of routing traces and a ground ring formed thereon; and
   a display module underlying the touch screen, wherein the display module is configured to generate one or more of images, video content and graphical user interfaces for display on the touch screen;
   wherein the ground ring comprises inner edges, which conform to and surround a periphery of the transmit lines, receive lines and routing traces, and outer edges that are substantially parallel and adjacent to edges of the touch panel substrate; and
   wherein a width of the ground ring between the inner edges and the outer edges of the ground ring is inconsistent along opposing sides of the touch panel substrate.

2. The touch screen display device as recited in claim 1, wherein at least one outer edge of the ground ring extends past at least one outer edge of the display module along at least one entire side of the display module.

3. The touch screen display device as recited in claim 1, wherein the outer edges of the ground ring extend past outer edges of the display module along an entire first side and along an entire second side of the display module.

4. The touch screen display device as recited in claim 1, wherein the outer edges of the ground ring extend past outer edges of the display module along an entire first side, along an entire second side and along an entire third side of the display module.

5. The touch screen display device as recited in claim 1, wherein the width of the ground ring is inconsistent across portions of the touch panel substrate.

6. The touch screen display device as recited in claim 1, wherein the ground ring is substantially wider in a top portion of the touch panel substrate and substantially narrower in a bottom portion of the touch panel substrate.

7. The touch screen display device as recited in claim 1, wherein the ground ring is substantially wider in a bottom portion of the touch panel substrate and substantially narrower in a top portion of the touch panel substrate.

8. The touch screen display device as recited in claim 1, wherein the ground ring is substantially wider on a first side of the touch panel substrate and substantially narrower on a second side of the touch panel substrate, and wherein the second side opposes the first side.

9. The touch screen display device as recited in claim 1, wherein the ground ring is symmetrically formed on the opposing sides of the touch panel substrate.

10. The touch screen display device as recited in claim 1, wherein the ground ring is not symmetrically formed on the opposing sides of the touch panel substrate.

11. An information handling system including a touch screen display device, the touch screen display device comprising:
  a touch screen including a touch panel substrate having a plurality of transmit lines, a plurality of receive lines, and a plurality of routing traces formed thereon, wherein the touch panel substrate further comprises a ground ring surrounding the transmit lines, receive lines and routing traces; and
  a display module underlying the touch screen, wherein the display module is configured to generate one or more of images, video content and graphical user interfaces for display on the touch screen;
  wherein the ground ring comprises at least one of:
    an inconsistent width; and
    an outer edge that extends past an outer edge of the display module along at least one entire side of the display module.

12. The information handling system as recited in claim 11, wherein the ground ring comprises outer edges that extend past outer edges of the display module along an entire first side, along an entire second side and along an entire third side of the display module.

13. The information handling system as recited in claim 11, wherein the ground ring comprises inner edges, which follow and surround a periphery of the transmit lines, receive lines and routing traces, and outer edges that are substantially parallel and adjacent to edges of the touch panel substrate.

14. The information handling system as recited in claim 13, wherein the width of the ground ring between the inner edges and the outer edges of the ground ring is inconsistent across portions of the touch panel substrate.

15. The information handling system as recited in claim 11, wherein the ground ring is substantially wider in a top portion of the touch panel substrate and substantially narrower in a bottom portion of the touch panel substrate.

16. The information handling system as recited in claim 11, wherein the ground ring is substantially wider in a bottom portion of the touch panel substrate and substantially narrower in a top portion of the touch panel substrate.

17. The information handling system as recited in claim 11, wherein the ground ring is substantially wider along a first side of the touch panel substrate and substantially narrower along a second side of the touch panel substrate, and wherein the second side opposes the first side.

18. The information handling system as recited in claim 11, wherein the ground ring is symmetrically formed on opposing sides of the touch panel substrate.

19. The information handling system as recited in claim 11, wherein the ground ring is not symmetrically formed on opposing sides of the touch panel substrate.

20. A method, comprising:
  providing a touch screen display device including a touch screen and a display module underlying the touch screen, wherein the touch screen comprises a touch panel substrate having a plurality of transmit lines, a plurality of receive lines, a plurality of routing traces and a ground ring formed thereon, wherein the ground ring surrounds the transmit lines, receive lines and routing traces, and wherein an outer edge of the ground ring extends past an outer edge of the display module along at least an entire first side and an entire second side of the display module; and
  discharging current of an electrostatic discharge (ESD) event to ground through the ground ring.

* * * * *